May 5, 1970 C. S. WALKER 3,510,374
METHOD AND CONTROL APPARATUS FOR REGULATING APPARATUSES
Filed April 20, 1964 6 Sheets-Sheet 1

INVENTOR
Charles S. Walker
BY William T. Fryer III
ATTORNEY

United States Patent Office 3,510,374
Patented May 5, 1970

3,510,374
METHOD AND CONTROL APPARATUS FOR REGULATING APPARATUSES
Charles S. Walker, Lake Mohawk, N.J., assignor to Industrial Nucleonics Corporation, a corporation of Ohio
Filed Apr. 20, 1964, Ser. No. 360,994
Int. Cl. G01
U.S. Cl. 156—64                              12 Claims

ABSTRACT OF THE DISCLOSURE

One embodiment of control apparatus in accordance with the present invention comprises a gauge means for indicating a material property at one location in a zone of the material and for indicating the property average at least partially across the material dimension including the zone. A regulating means can be adjusted to substantially uniformly vary the property in the zone. A controller means compares the one location property indication with a target signal and actuates the regulating means to reduce the difference between the target signal and the location property indication to substantially zero. Means is provided for changing the target signal only when the aforementioned difference is substantially zero as a function of the difference between the property average and one target signal representing a desired target property to another target signal to cause the controller means to compare the indicated property with the another target signal that brings the average zone property to the desired target property.

---

The present invention relates to industrial systems for the production or treatment of a material.

Method and control apparatus are described in the pending patent application of George R. Gerhard, James E. Reider, and Charles S. Walker, filed Mar. 31, 1964, Ser. No. 356,176, for a regulating apparatus. The present invention is concerned with another method and control apparatus for maintaining a desired target property more uniformly across a material dimension.

The present invention has application to a number of types and arrangements of regulating apparatuses for many different properties. For the purpose of describing a preferred embodiment, the method and control apparatus of the present invention is described as applied to a rubber calender. Other types of regulating apparatuses and their arrangements in accordance with the present invention will be apparent from the following description.

An important, if not the most important consideration in the manufacture of rubber products, such as tires, is the uniformity of the rubber on the bar fabric cord. Gauges, such as the nuclear radiation type, permit precise measurement of the rubber sheet thickness or mass per unit area at several locations (although weight per unit area is usually used in referring to the measured property in a calendering process, only thickness will be used in the following description to simplify the presentation). These measurements have been used as a basis for adjusting the calender to a desired sheet thickness. These adjustments have been with reference to a fixed target representing a target thickness and the gauges were set at locations across the sheet width where tests showed the sheet thickness was at the approximate average of the controlled sheet zone. The assumption was that the profile thickness for a sheet from any given calender once set up remained essentially constant.

This assumption does not hold for many calenders, or for many other types of regulating apparatuses. There is a significant profile thickness variation in some rubber calenders. And the fact remains that calender control should be with reference to the average property.

One approach that has been used for maintaining a substantially uniform property in a controlled zone in the face of profile property variations is illustrated in U.S. Pats. 3,000,438, to F. M. Alexander, issued Sept. 19, 1961, and 3,015,126, to W. C. Hays et al., issued Jan. 2, 1962. A single gauge scans across the material dimension of the controlled zone and the average deviation from a fixed target signal, representing a target property, is computed. A regulating apparatus is adjusted, using the average deviation as a control signal, to uniformly change the average material property to the target property.

While the adjustment of a regulating apparatus with a control signal that is a function of an average property deviation of the controlled material from a target property is generally known, as mentioned above, method and control apparatus for adjusting a regulating apparatus having one or more stationary gauges for continuous adjustment of one or more controlled zones in the face of profile property variations has not been disclosed heretofore.

It is an object of the present invention to provide method and control apparatus for adjusting a regulating apparatus to maintain a more uniform property across a material dimension.

It is a further object of the present invention to provide method and control apparatus utilizing a stationary gauge that takes into consideration property variations across a material dimension to maintain a more uniform property across the material dimension.

It is a further object of the present invention to provide a simple and relatively inexpensive method and control apparatus for regulating the property of a material zone to a target property.

It is another object of the present invention to provide method and control apparatus for utilizing one or more stationary gauges in a manner that takes into consideration the property variation across a dimension of one or more control zones to maintain the average property of each controlled zone across the dimension substantially at a target thickness for the respective zones.

These and other objects that will be apparent from the following description are achieved by adjusting the normally fixed target property used in controlling the regulating apparatus. In one form the method of the present invention provides for the control of a material zone property where the property at one location in the zone is measured by a stationary gauge. The measured property is compared with a target property and the regulating apparatus is adjusted to change the location property to the target property. The target is adjusted only when the measured location property is substantially at the target property as a function of the difference between the average property of at least a portion of the material across the material width, including the measured location in the zone, and the target property to bring the average material property in the zone to the target property.

One embodiment of control apparatus in accordance with the present invention comprises a gauge means for indicating the property at one location in a zone of the material and for indicating the property average at least partially across the material dimension including the zone. A regulating means can be adjusted to substantially uniformly vary the property in the zone. A controller means compares the location property indication with a target signal and actuates the regulating means to reduce the difference between the target signal and the location property indication to substantially zero. Means is provided for changing the target signal only when the aforementioned difference is substantially zero as a function of the difference between the property average and one target signal representing a desired target property to another target signal to cause the controller means to compare the indicated property with the another target signal that brings the average zone property to the desired target property.

The detailed description of the preferred embodiments follows, reference being made to the attached drawings, wherein.

Figure 1:
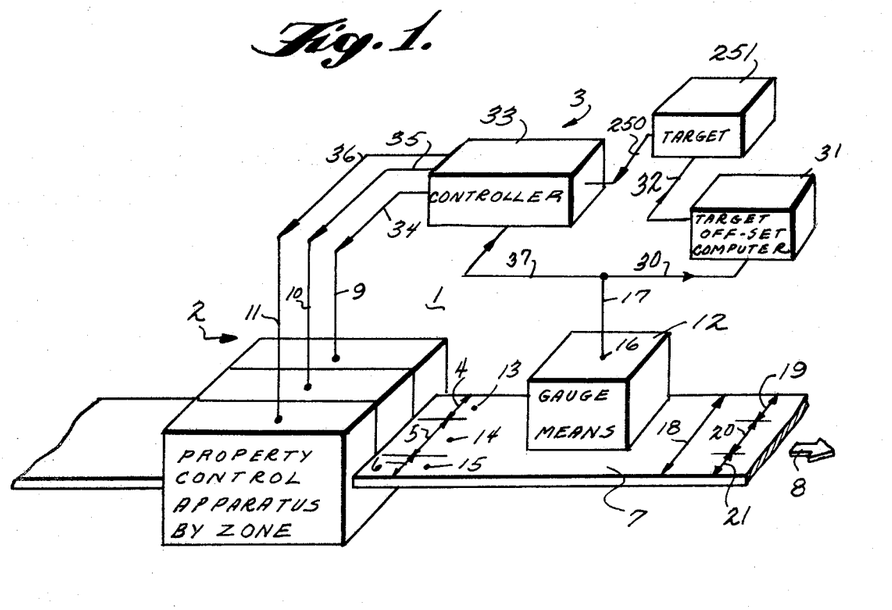
FIG. 1 is a perspective view of an industrial system, in block diagram form, for illustrating one type of control apparatus and method of the present invention.

The method of the present invention can be illustrated by the control system 1 in FIG. 1, comprising regulating apparatus 2 and control apparatus 3. Regulating apparatus 2 can take several forms and has the feature of having adjustments, controlled by control signals at inputs 9, 10, and 11, for separately varying a property substantially uniformly in individual zones 4, 5, and 6, respectively, across a dimension, here the width, of material 7 that moves in the direction of arrow 8. The property can be of many kinds, such as moisture, density, thickness, and others in various materials, such as paper, metal, plastics, for example. The term "separately" is used to mean that a predominate change occurs only in one zone, the selected one, even though some change of a lesser extent can occur in one or more of the other zones.

Control apparatus 3 includes gauge means 12 for measuring or indicating the property in material 7. One of the functions of gauge means 12 is to measure the controlled property at locations 13, 14, and 15 on material 7 in zones 4, 5, and 6, respectively, and provide a signal at gauge output 16 over line 17 proportional to the property. Another function of gauge means 12 is to scan across a dimension of material 7, here the width, either entirely across the material width, as represented by dimension line 18, or individually across zones of the material width, represented by the width dimension lines 19, 20, and 21.

Material zones 19, 20, and 21 can include the width dimensions of controlled zones 4, 5, and 6, respectively, for example, or at least portions of zones 4, 5, and 6 including locations 13, 14, and 15, respectively. The scanned and controlled dimension need not to be a material width, as it is apparent that the present invention can be applied to other dimensions of a material. Numerous types and arrangements of gauges can be used to perform these measurements.

The conventional operation of a control apparatus for maintaining a substantially uniform property in zone 4 is to compare the property indication from location 13 in a controlled that automatically adjusts the property at location 13 to a fixed target representing a target property. The property at other locations in the zone can be far different from the target property.

In the present invention the property indication at location 13 is compared with a target and the location 13 property is adjusted to the target property. The average property deviation at least partially across the dimension of zone 4 from the target is computed. The target is adjusted or "off-set" to bring the average property for zone 4 substantially to the target representing target property. Zone 4 is thereafter controlled with reference to the average zone property.

This method of control is practiced by control apparatus 3 (FIG. 1). The property indication for location 13 is coupled over line 37 to a controller 33 that compares the property indication with a target signal, representing a target property, from a target source 251 and produces a control signal proportional to the difference. The control signal is coupled over line 34 to input 9 of regulating apparatus 2 to adjust the property in zone 4 to the target property. This adjustment continues until the location 13 property is within a prearranged range of or within a predetermined deadband about the target property. When this range is reached or the location 13 property is within the deadband, equal to or close to the target property, the next step occurs.

Gauge means 16 has supplied the output signal from a scan across the material width, zone 19 for example, to a target offset computer 31 over line 30. Target offset computer 31 responds to the average property across zone 19 and compares it with the target property. A target offset control signal is produced over line 32 and coupled to target source 251 to offset or change the target signal on line 250. The target signal change is inversely proportional to the property average deviation from the target property, so that the average property of zone 4 is changed to the target property.

Figure 2:
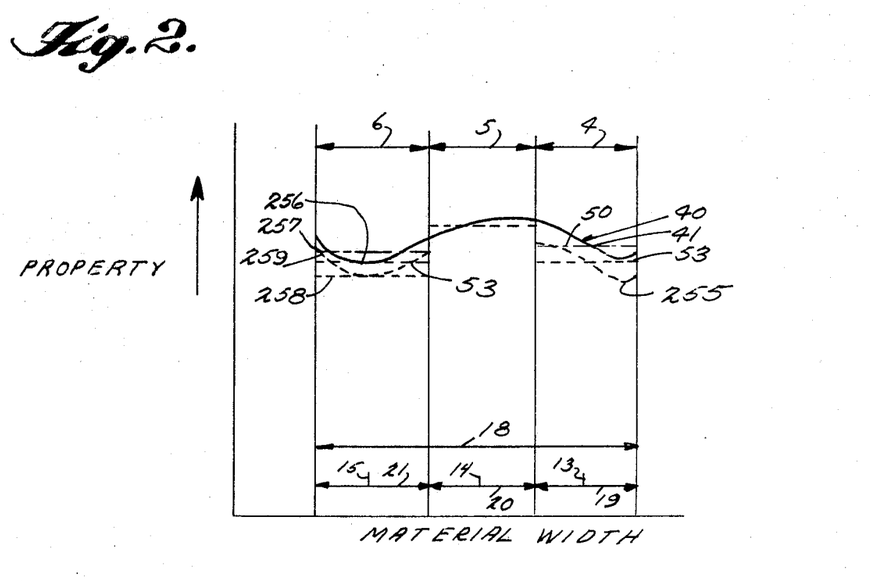
FIG. 2 is a graph of a property versus material width, and shows the average property for individual zones across the width and the location of property measuring gauges to illustrate the method of the present invention.

The operation of control apparatus 3 is illustrated graphically in FIG. 2, wherein the material property profile is curve 40 and the indicated property at location 13 is at region 41 on curve 40. The zone property average is shown by line 50 above the desired target property represented by line 53. Controller 33 compares the location 13 property at 41 with the target property 53 and sends a control signal to regulating apparatus input 9 to change the property across the dimension of zone 4 to place the location 13 property on or close to target property 53 as indicated by dash line curve 255. Target offset computer 31 immediately responds to the average property across zone 4, but no target offset signal is coupled to target source 251 until the location 13 property is at the target property 53 or close to it. A new property average is determined by the target offset computer 31 from another scan and the property average is coincident with target property 53. No target offset signal appears on 32 since the difference between the property average and the target property is zero.

Another control sequence is illustrated by considering zone 6. The same or a different target property can be set by having another adjustable target signal from target source 251. Considering the example of the same target property 53, the location 15 property, region 256 is right on the target property 53. The average property for zone 6, represented by line 257, is obtained from a scan of zone 21. Controller 33 does not provide a control signal over line 35 at regulating apparatus input 11 since the location 15 and target property are equal. An offset control does come from target offset computer 31 to change the target signal to another signal corresponding to a smaller target property, represented by line 258. The average property zone 6 is, consequently, decreased to equal the target property 53 as shown by the new profile curve 259.

The control for zone 5 can follow the same pattern. Either another target signal representing a different target property or the same target property can be used. The average of zone 20 is compared with the chosen target property. If the location 14 property is at this target property or close to it and the zone 20 property average is not equal to this target property, the target signal is offset after the controller 33 brings location 14 property to or close to the target property by furnishing a control signal over line 35 to regulating apparatus input 10.

Figure 3:
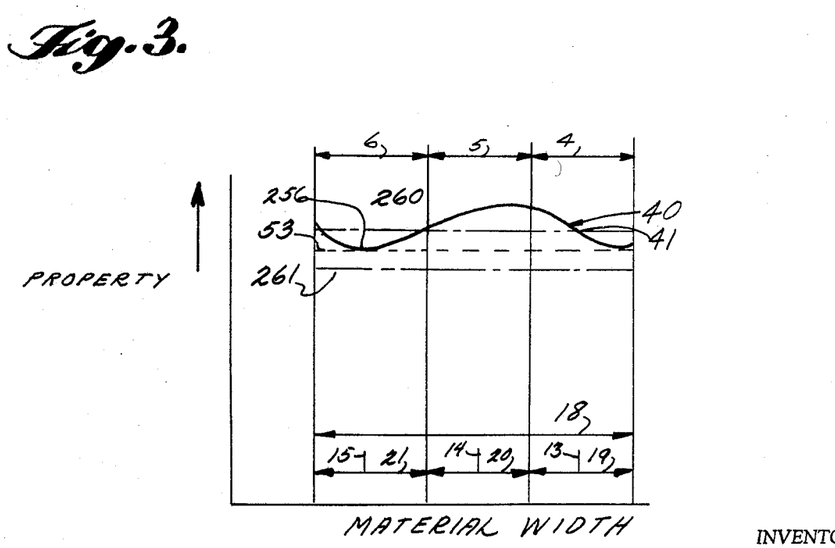
FIG. 3 is a graph of a property versus material width, and shows the property average for the entire width and the location of property measuring gauges to illustrate the method of the present invention.

It is important to frequently recompute the one or more average properties. Frequent scans permit adjustment for shorter term property variations and a more uniform profile. The scan need not precisely follow the controlled zone, although this is preferable. More or less than the width of the controlled zone along the chosen dimension can be scanned. These compromises are very useful in simplifying the control apparatus. For example, the entire dimension, width 18, including the zones 19, 20, and 21 can be scanned to derive an average property, represented by line 260 in FIG. 3 where curve 40 and target property 53 are shown again. Considering zone 6, for example, controller 33 initially makes no adjustment of regulating apparatus 2 when the target signal is set for the target property 53. Target offset computer 31 compares the location 15 property at 256 with the average property 260 and offsets the target signal to a signal corresponding to the new target, represented by line 261. The average property of zone 6 is brought down to substantially equal target property 53. The control of zones 4 and 5 follows the sequences as described above using property average 260 for each zone.

The adjustment and control action are such that the aim is to make the average property and target property equal. However, the factors of human response, apparatus inertia, or built in deadbands sometimes prevent exact equality and the adjustment to substantial equality is the more practical form of the method of the present invention.

Figure 4:
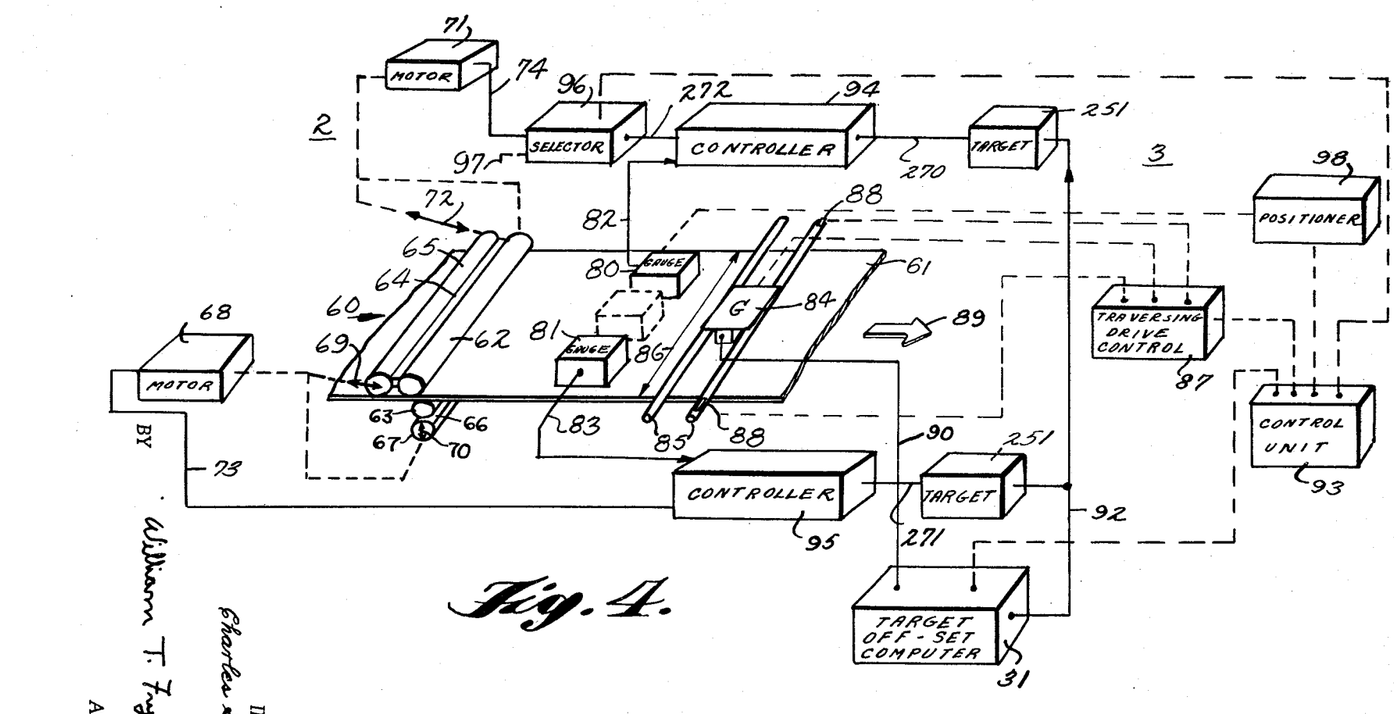
FIG. 4 is a perspective view of a rubber calender and one form of control apparatus, in a block diagram, employing three gauges in accordance with the present invention.

The method of the present invention is illustrated further by a specific embodiment of a regulating apparatus 2, such as rubber calender 60 (FIG. 4). Rubber calender mill 60 is one of several conventional designs and much of the apparatus connected with actuating the calender is eliminated or shown in general form to simplify the presentation. Basically, a sheet 61 of bare fabric cords is passed in the direction of arrow 89 between driven rolls 62 and 63 arranged to rotate about stationary axes. Adjacent roll 62 is a supply of gum rubber 64 that is compressed by a backing roll 65 and spread by roll 62 onto one side of sheet 61. A similar arrangement of a supply of gum rubber 66 and a backing roll 67 coats the opposite side of sheet 61.

The thickness of rubber on sheet 61 is uniformly changed by simultaneously adjusting the spacing between each of backing rolls 65 and 67 and its adjacent roll 62 and 63, respectively, either to a closer or greater spacing equally along their length. The profile thickness of a zone across the width of sheet 61 can be changed by simultaneously adjusting the position at one of backing rolls 65 and 67 by a motor 68 to cause a simultaneous common withdrawal or advance in the directions of arrows 69 and 70 respectively, corresponding to an increase and decrease of thickness, respectively, in a zone across the sheet width at this end of sheet 61. Similarly, the thickness of a zone across the sheet width at the opposite end can be changed by motor 71, as indicated by arrow 72 for backing roll 65 and an arrow corresponding to arrow 70 for backing roll 67. Motors 68 and 71 are energized by separate control signals over lines 73 and 74, respectively, in one direction to increase thickness and the opposite direction to decrease the rubber thickness.

The thickness of the rubber on sheet 61 is measured at two locations by gauges 80 and 81 stationarily mounted near opposite edges of sheet 61. Gauges 80 and 81 provide an output signal over lines 82 and 83 respectively proportional to rubber thickness. Average rubber thickness across the width of sheet 61 is dervied from a scanning gauge 84 mounted for movement along bars 85. Suitable means is provided (not shown) to drive gauge 84 across the width of sheet 61, represented by dimension line 86, actuated by a traversing drive control 87 in cooperation with limit switches 88 on one of bars 85, as is conventional practice. The output signal from gauge 84 on line 90 is coupled to target offset computer 31 that processes the signal, as previously described, to produce a target offset control signal over line 92 that is proportional to the deviation of average thickness across sheet width 86 from the target thickness. The coordination of the scanning operation, and other operations to be described later are accomplished by a control unit 93.

The target signal from target sources 251 are coupled to separate controllers 94 and 95 over lines 270 and 271, respectively. Controllers 94 and 95 continuously compare the respective target signal with the output signal from gauges 80 and 81, respectively, coupled over lines 82 and 83, respectively. Each controller continuously produces a control signal proportional to the difference between target signal and gauge output signal. The control signal from controller 95 is coupled directly over line 73 to energize motor 68 in the direction to change the rubber thickness to the thickness corresponding to the target signal set to the desired target thickness. The control signal from controller 94 is coupled over line 272 to a selector 96 that has one position coupling the control signal directly to motor 71 to change the rubber thickness to the thickness corresponding to the target signal set to the desired target thickness. Selector 96 has another position which couples the control signal to line 97, for a purpose to be described hereinafter.

Control unit 93 initiates a scan of sheet 61 periodically to replace the target offset signal from target offset computer 31 with a more recently computed average property. The target offset control signal is coupled over line 92 from target offset computer 31 to target sources 251. After the locations measured by gauges 80 and 81 are brought to target thickness, or within a deadband about target thickness, the target signals are changed, or offset, to bring the average thickness across the sheet width to the target thickness. After each scan by gauge 84 the average property or its equivalent is recomputed and the target signals are offset in accordance with any change from the previously computed property average.

Some rubber calenders or other similar regulating apparatuses have provision for separately adjusting the rubber thickness at the center of the sheet. For example, cross-axis or roll bending adjustment can be used. With such an arrangement control unit 93 periodically actuates a positioner 98 that moves gauge 80 to a position at the center of sheet 61. Selector 96 is actuated by control unit 93 to connect the output of controller 94 to line 97 which energizes the motor (not shown) that initiates the changes to make the indicated rubber thickness at the sheet center substantially equal to the target thickness. The target signal is offset following the adjustment of the center location to target thickness or within a deadband about target thickness.

Control apparatus can be in several arrangements to practice the method of the present invention. For example, the manner of computing and introducing the target offset step can be accomplished in several ways. The conventional controller, utilizing a fixed target, can be modified simply by offsetting the target in proportion to deviation of the average property from target property. Another approach is to use a computer that compares the target signal with the output signal of the fixed gauges to adjust the regulating apparatus and compare the average property with the target signal for the target property and offsets the target signal, in effect, performing both computer and controller functions.

Figure 5:
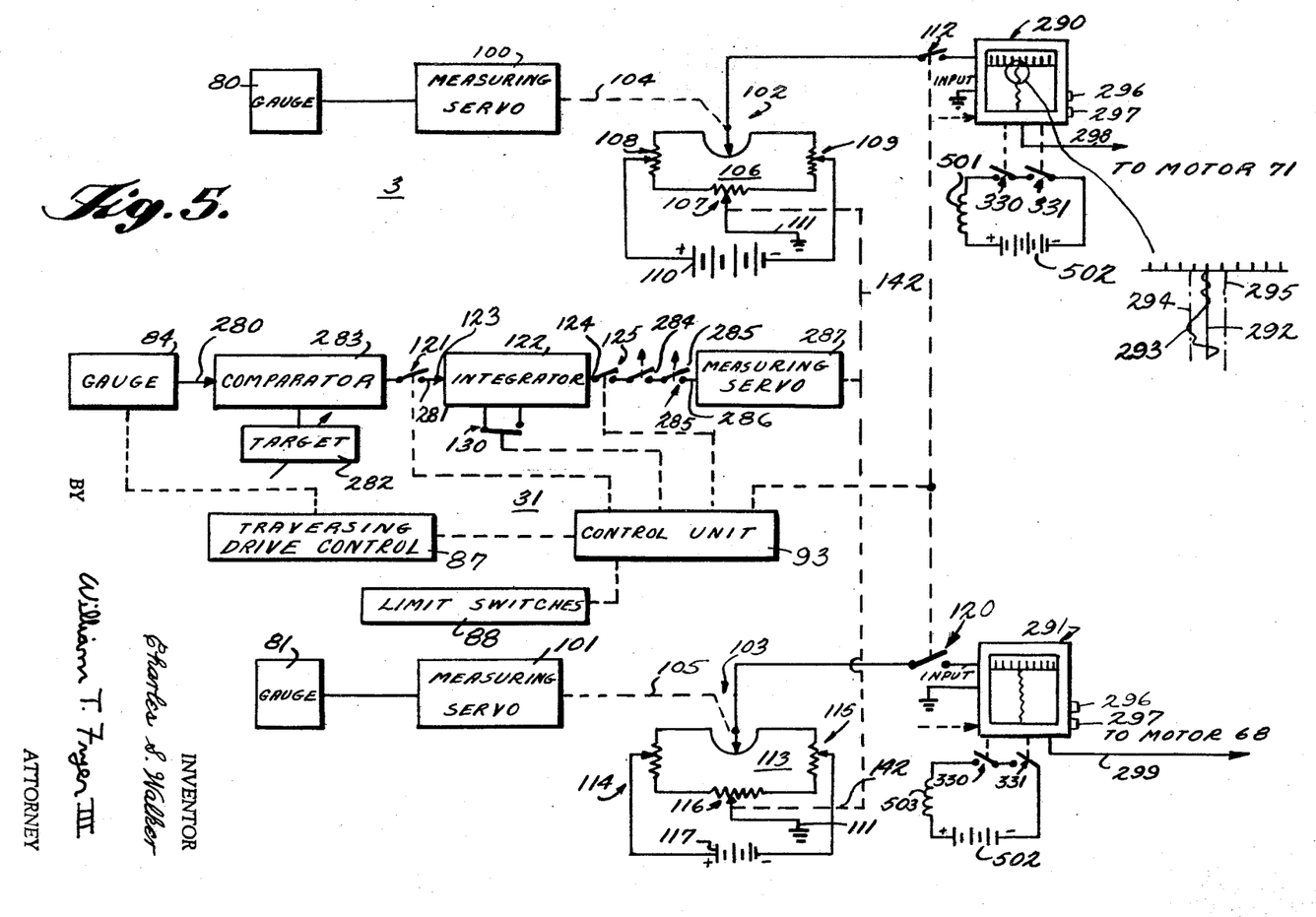
FIG. 5 is a circuit diagram, partially in block diagram form, of a control apparatus for a regulating apparatus, such as shown in FIG. 4, in accordance with the present invention.

A control apparatus embodiment that adjusts, offsets, the targets of a conventional controller for the industrial system 1 shown in FIG. 4 is illustrated in FIG. 5. Each of gauges 80 and 81 has a measuring servo 100 and 101, respectively, that adjusts the position of the arm of repeat slidewire potentiometers 102 and 103, respectively, as indicated by dash lines 104 and 105, respectively. Repeat slidewire potentiometer 102 forms a part of a DC bridge 106 having a target potentiometer 107 connected at opposite fixed ends by separate balancing potentiometers 108 and 109. The arms of balancing potentiometers 108 and 109 are connected to opposite ends of a DC source, such as battery 110. The arm of target potentiometer 107 is connected to ground 111 and the control signal from bridge 106 is taken between ground and the arm of repeat slidewire potentiometer 102 through a switch 112, for amplification (not shown) to ultimately energize motor 71.

The control signal for motor 68 is derived in a corresponding manner by bridge 113 that includes balancing potentiometers 114 and 115 connecting together, by their fixed ends, the fixed ends of repeat slidewire potentiometer 103 and a target potentiometer 116. Bridge 113 is energized by a DC source 117 connected between the arms of balancing potentiometers 114 and 115. The arm of target potentiometer 116 is connected to ground 111 and the control signal is derived between ground 111 and the arm of repeat slidewire potentiometer 103. The control signal is coupled through a switch 120 for amplification (not shown) to ultimately energize motor 68.

The offset of target potentiometers 107 and 116 is performed by the target offset computer 31 coupled to scanning gauge 84 over line 280. The heart of target offset computer 31 is an integrator 122 that averages an input signal received over line 281 to produce an output signal over line 124 that is proportional to this average. Integrator 122 can take several forms. The input signal to integrator 122 is produced by a comparator 283 that processes a target signal, corresponding to a desired target thickness, from a manually adjustable target source 282, and the output signal from gauge 84. Comparator 283 produces an output signal over line 281 that is a function of the difference between the target signal and the gauge 84 output signal. In other words, the output signal from comparator 283 is proportional to the deviation of the measured thickness from target thickness. When the measured thickness is larger than the target thickness the comparator output signal is of one polarity and when the target thickness is greater than the measured thickness the comparator output signal is of the opposite polarity, for example.

The output signal from integrator 122 is proportional to the average deviation of the gauge output signal from the target thickness. The integrator output signal is coupled through a series of switches 125, 284, and 285 to the input 286 of a measuring servo 287. Switch 125 is actuated by control unit 93 and switches 284 and 285 are actuated in response to the output of gauges 80 and 81, as will be described. Measuring servo 287 is mechanically coupled to drive the ganged arms of target potentiometers 107 and 116. Initially the arms of target potentiometers 107 and 116 are set to positions that provide equal target signals for the desired target thickness, the same target thickness set on target source 282. These arm positions are maintained as long as the input signal to measuring servo 287 is zero. When the input signal has one polarity, measuring servo 287 drives each of the target arms equally to a new position corresponding to the input signal magnitude in a direction that changes the target signals to bring the sheet average thickness to the target thickness. In a corresponding manner, the targets are adjusted in the opposite direction from the target thickness position when the input signal to measuring servo 287 is of the opposite polarity to a position corresponding to the input signal magnitude.

There is an interaction between the target offset computer 31 and the output signals of gauges 80 and 81. As previously mentioned, the target signal is not offset from target thickness until the indicated location property is as the target thickness or close to it. Many techniques can be used to accomplish this result, both manual, mechanical or electrical, or a combination using any one or all of these. For example, in the normal control apparatus the single point gauge has a deadband about the target property and no control action is initiated while its measurement is within this deadband. This deadband can be utilized so that the single point gauge can initiate control action whenever its measurement is outside its deadband and not when inside the deadband, and the target offset can occur only when the single point gauge measurement is within the deadband. This arrangement allows the same deadband to be used for the automatic control and target offset. Another arrangement is to use separate deadbands for the single point automatic control and target offset. As an illustration, the control signal from each of controller computers 106 and 113 can be coupled also to a separate deadband circuit that produces a switch activating signal only if the control signal is within certain limits about the signal corresponding to the location thickness being at target thickness, usually zero signal.

In the circuit of FIG. 5 where a separate deadband is used for target offset, the control signal from computer 106 is coupled to a recorder 290 and the control signal from computer 113 is coupled to a recorder 291. Recorders 290 and 291 plot the deviation of the respective gauge output signals from target thickness (see the insert enlargement of the recorder chart where line 292 is the target and curve 293 is the sheet thickness deviation). Also, recorders 290 and 291 have a mechanical deadband, such as provided with a Bristol recorder G1D2. The deadband limits 294 and 295 (see insert enlargement) can be set separately by knobs 296 and 297, respectively. A limit switch 330 is closed when the control signal falls between limit 294 and target 295 and opens when the limit is exceeded. A limit switch 331 operates the same way for limit 295. When the control signal coupled to recorder 290 is within this deadband about target line 292 a control action is initiated. Both limit switches 330 and 331 are connected in series with a battery 502 and are closed when the signal is in the deadband to energize relay coil 501 that closes switch 284 in target offset computer 31. When the control signal coupled to recorder 291 is within this same deadband the series combination of the limit switches 330 and 331 is closed, to energize a relay coil 503 that closes switch 285 in target offset computer 31. When either one of switches 330 and 331 of recorders 290 and 291 opens, indicating the control signal is not in the deadband the corresponding relay controlled switch 284 or 285 is opened and the target signal will not be offset. The deadband limits 294 and 295 can be adjusted close to the target line for optimum of control apparatus 3. The control signals from computers 106 and 113 are coupled to motors 71 and 68, respectively, over lines 298 and 299, respectively.

The operation of control apparatus 3 begins with the continuous adjustment of regulating apparatus 2 whenever the indicated thickness deviates from the target thickness and switches 112 and 120 are closed. The arms of target potentiometers 107 and 116 are at the target thickness position. Switch 125 is opened and switch 121 closed by control unit 93 just prior to each scan of gauge 84. When the scan is completed switch 121 is opened and switch 125 is closed. If the control signals from both computers 106 and 113 are within the deadband limits 294 and 295, switches 284 and 285 are closed and measuring servo 287 offsets the arms of target potentiometers 106 and 113. The new target arm position produces another target signal that is offset from the target signal for the target thickness by an amount and in the direction to change the average sheet thickness to the target thickness. Swiches 112 and 120 can be opened by control unit 93 when switch 125 is closed until the target potentiometers are reset and then closed. Alternatively, the switches 112 and 120 can be closed all the time usually without any difficulty. The operation of the various switches by control unit 93 is indicated by a dotted line from the switch to control unit 93.

It is apparent that the control signal from integrator 122 can be introduced in a number of ways to offset the operation of a controller. For example, the offset control signal can be used as a bucking voltage to change the control signal from a controller.

Figure 6:
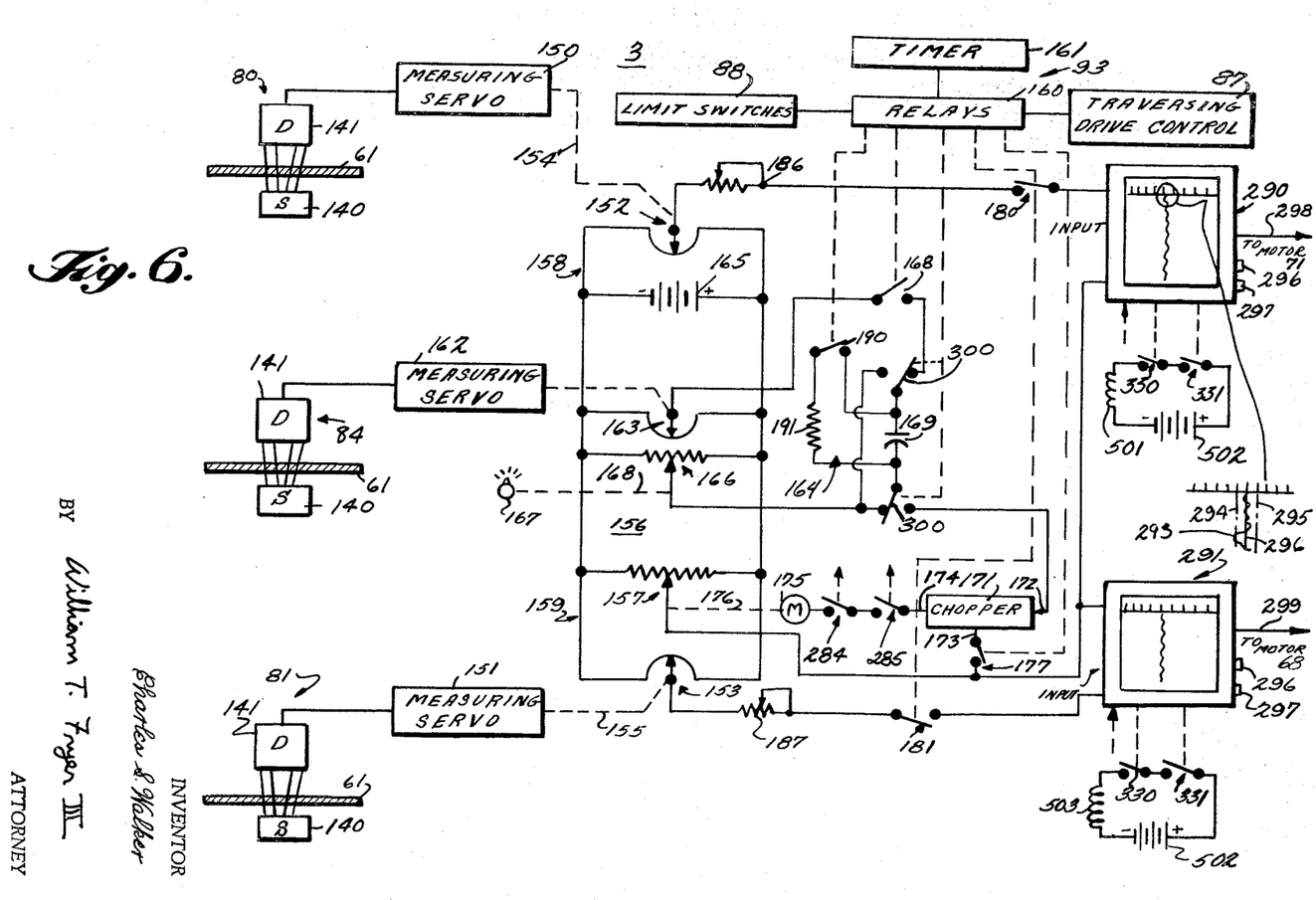
FIG. 6 is a circuit diagram, partially in block diagram form, of another embodiment of a control apparatus for a regulating apparatus, such as shown in FIG. 4, in accordance with the present invention.

A control apparatus embodiment that combines the computation of average thickness and the production of the control signals using a bucking signal arrangement is shown in FIG. 6. Gauges 80 and 81 are each nuclear transmission gauges, such as sold by Industrial Nucleonics Corporation, having a radioactive source 140 and a radiation detector 141 disposed on opposite sides of sheet 61. A gauge output signal is taken from each of detectors 141 and coupled to measuring servos 150 and 151, respectively, that drive the arms of repeat slidewire potentiometers 152 and 153, respectively, as indicated by dash lines 154 and 155, respectively. The gauge output signal is a function of the thickness, or expressed another way the weight per unit area of sheet 61 at the measured location.

Repeat slidewire potentiometers 152 and 153 are part of a computer 156 which has the functions of deriving the average deviation of sheet thickness from target thickness and setting a reference potentiometer 157, common to two DC bridges 158 and 159, in proportion to this deviation. The operation sequence of computer 156 is provided by control unit 93, here shown as a combination of relays 160 energized by a timer 161 and connected with limit switches 88 to actuate traversing drive control 87 and various switches in the manner to be described hereinafter.

The scanning movement of gauge 84, including a radioactive source 140 and detector 141, is periodically initiated by timer 161. The output of detector 140 of gauge 84 is coupled to a measuring servo 162 that drives the arm of a repeat slidewire potentiometer 163 in computer 156. Repeat slidewire potentiometer 163 forms part of an average thickness deviation computer 164 including a DC source 165 connected across repeat slidewire 163 and a target potentiometer 166 having an arm positioned by adjusting target set knob 167, as indicated by dash line 168, and an integrating capacitor 169. As gauge 84 scans across sheet 61 the gauge output signal is compared with the setting of target potentiometer 166. The potential difference between the arms of repeat slidewire 163 and target potentiometer 166 is coupled across integrating capacitor 167, through a switch 168, closed when the scan begins, through a reversing switch 300 that, in one position as shown connects capacitor 169 to bridge 156 while average thickness deviation is computed and reverses the connection of capacitor 169 in series with the arm of target potentiometer 166.

Following the scan of gauge 84, switch 168 is opened, reversing switch 300 goes to its other position, and the potential at the arm of target potentiometer 166 and across integrating capacitor 169 is compared with the potential at the arm of reference potentiometer 157 by a chopper 171. Chopper 171 receives the series potentials from the arm of target potentiometer 166 and integrating capacitor 169 at input 172 and receives the potential from reference potentiometer 157 at input 173 through switch 177, closed with the reversal of switch 300. Chopper 171 provides an output over line 174 proportional to the difference between these input potentials to energize a servomotor 175 that drives the arm of reference potentiometer 157, as indicated by dash line 176. The arm of reference potentiometer 157 is driven to a position corresponding to a potential equal to the potential representing the difference between target thickness and the average deviation of the sheet from target thickness. Switches 300 and 177 are reversed and opened, respectively, and henceforth, the potentials at the arms of repeat slidewire potentiometers 152 and 153 are compared with the potential at the arm of reference potentiometer 157 and coupled, by closing switches 180 and 181 following the computation of average deviation from target thickness, to recorders 290 and 291 and then to motor 71 and motor 68, respectively. There is provision for separately adjusting the control signals by means of adjustable resistors 186 and 187 in series with lines from the arm of repeat slidewire potentiometers 152 and 153 respectively to the inputs of recorders 290 and 291, respectively.

Bridges 158 and 159 are arranged to provide a zero control signal at the input of recorders 290 and 291, respectively, when the average sheet thickness equals or substantially equals the target thicknesses. The average of sheet thickness deviations from the target thickness provides control signals of appropriate polarity to energize the respective motors 71 and 68 to change the average sheet thickness to the target thickness.

Reference potentiometer 157 is not offset from the position corresponding to target thickness unless both control signals from computers 158 and 159 are within the deadband limits 294 and 295 about target 296. When these control signals are within the deadband limits, switches 284 and 285 are closed to connect the output of chopper 171 to motor 175.

Prior to the next scan by gauge 84, integrating capacitor 169 is discharged by closing switch 190 placing resistor 191 in parallel across integrating capacitor 169. The aforementioned sequence of operation is repeated periodically, initiated by timer 161, to recompute the sheet average deviation from target thickness. The control of motors 71 and 68 can be continuous, if desired, by leaving switches 180 and 181 closed during the recomputation of average sheet thickness and readjustment of average target potentiometer 157. The operation of switches periodically in the aforementioned reference is provided by relays 160 and timer 161 in any one of several conventional engineering arrangements. Switches energized by relays 160 have dash lines drawn thereto from relays 160.

Other arrangements of control apparatus can provide the functions of computing sheet average thickness and using the computed sheet average thickness and the fixed gauge indications to control rubber thickness.

The operation of the control apparatus 3 depicted in FIGS. 4, 5, and 6, is illustrated by reference to an assumed profile curve 310 of sheet thickness versus sheet width with the positions of gauges 80 and 81 being designated by arrows bearing these respective reference numerals. If an adjustment for the center of the sheet is available, a gauge can be placed at location designated by arrow 200 (dash lined). Average deviation from target thickness across sheet width 84 is computed, as described previously, represented by dash line 201. The sheet thickness at gauge 81 is slightly greater than the sheet thickness average 201. Controller 95 initiates a control signal that energizes motor 68 to decrease the sheet thickness at the location of gauge 81 to the target thickness 53. At the same time the sheet thickness at gauge 80 is considerably greater than the average thickness 201 and controller 94 initiates a control signal that energizes motor 71 to decrease sheet thickness at the location of gauge 80 to the target thickness 53.

Figure 7:
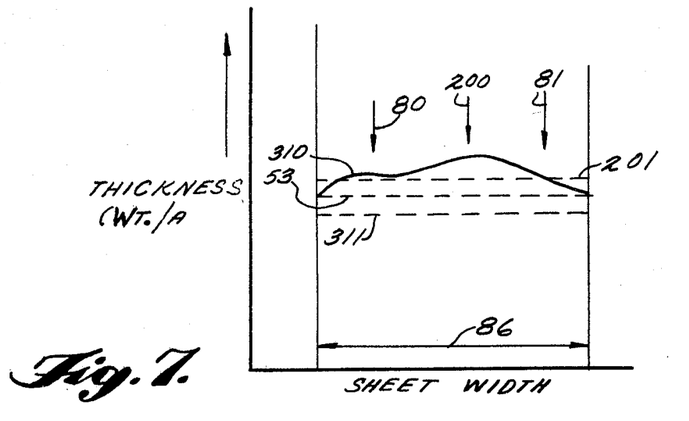
FIG. 7 is a graph of sheet thickness and average sheet thickness versus sheet width to illustrate the operation of the control apparatus shown in FIGS. 4, 5, and 6.

When the sheet locations measured by gauges 80 and 81 are at the target thickness 53 or within the deadband limits about desired target thickness 53, as previously mentioned, the target signal is changed or offset to reduce the target thickness to the level represented by line 311. Controllers 94 and 95 then bring the thickness at the measured locations to the new target thickness and the average sheet thickness is brought to the desired target thickness 53, resulting in a more uniform thickness across sheet 61.

As mentioned previously, the sheet average can be either of the entire sheet or at least partially across the sheet width including the controlled zone. It is preferable, of course, to have a separate average for each zone. However, the compromise of using entire sheet average still is useful and reduces the amount of control apparatus required.

Figure 8:
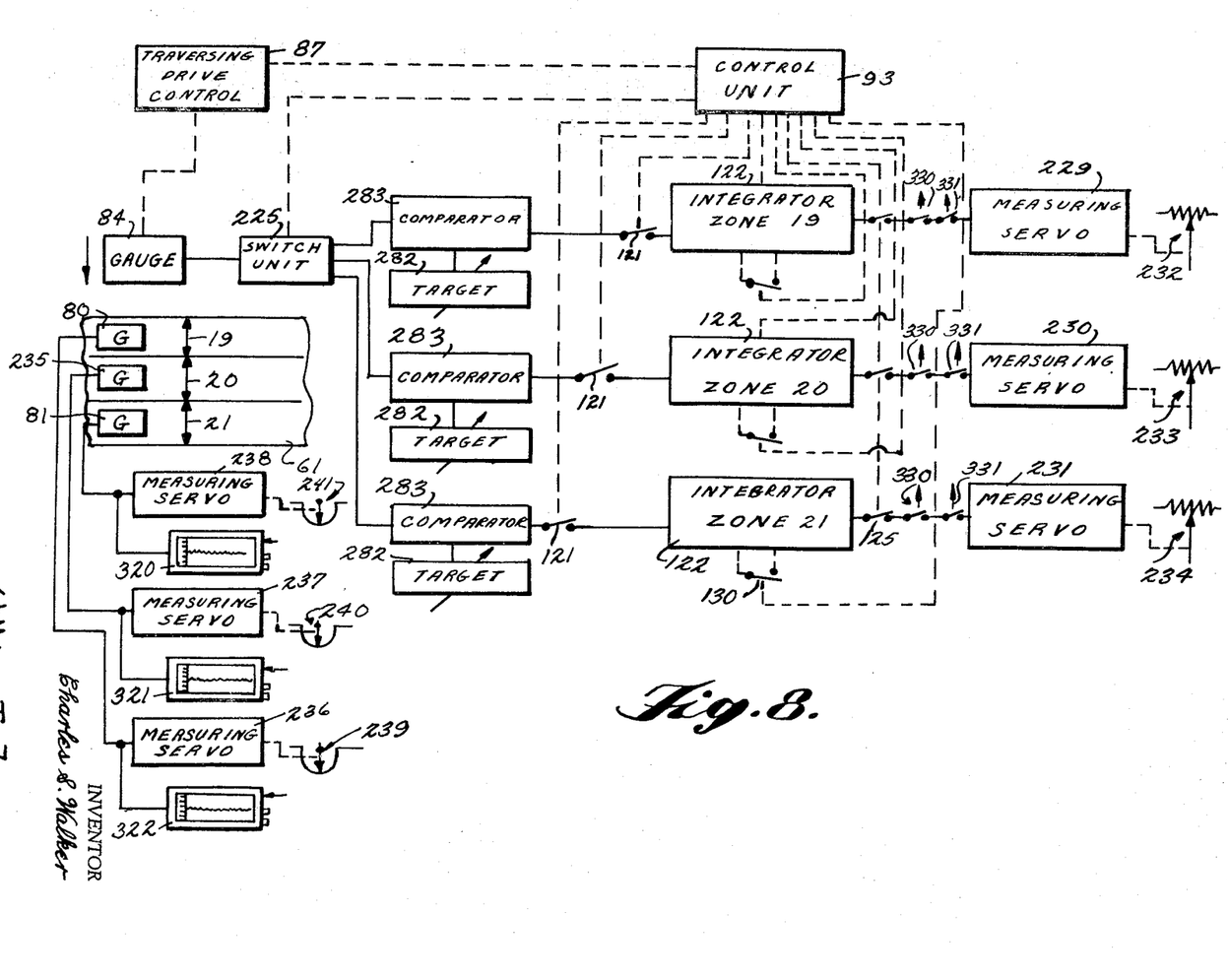
FIG. 8 is a block diagram of another form of control apparatus in accordance with the present invention.

A control apparatus with zone average scanning as described hereinbefore, is illustrated in FIG. 8. The specific control apparatus components are conventional, the arrangement in accordance with the present invention being the unique aspect. For example, the U.S. Pat. 3,000,438, to F. M. Alexander, issued Sept. 19, 1961, mentioned above describes a basic scheme for switching the output of a scanning gauge to separate integrators to sparate out zone property information. The same switching scheme can be used, as represented by switching unit 225 and control unit 93 to couple the output signal of gauge 84 to separate target offset computers for each of zones 19, 20, and 21, also identified in FIG. 1, on sheet 61 each comprising a comparator 283, target source 282, and integrator 122, as described for the control apparatus of FIG. 5, together with the associated switches energized by control unit 93 in the described sequence. Traversing drive control 87 functions periodically, as previously described, in response to a control signal from control unit 93 for gauge 84 to scan sheet 61.

The output signal from scanning gauge 84 for zones 19, 20, and 21 is stored in integrators 122 and coupled to measuring servos 229, 230, 231, for zones 19, 20, and 21, respectively, that position the arms of target potentiometers 232, 233, and 234, respectively, in the manner as previously described. Gauges 80 and 81 and another gauge 235 for the sheet center are coupled to measuring servos 236, 237, and 238, respectively, that position the arms of repeat slidewire potentiometers 239, 240, and 241, respectively. Repeat slidewire potentiometer 239 is to be in a bridge with target potentiometer 232; repeat slidewire potentiometer 240 is to be in a computer bridge with target potentiometer 233; and repeat slidewire potentiometer 241 is to be in a computer bridge with target potentiometer 234, in the manner previously described to produce a control signal proportional to the average sheet thickness deviation from target thickness for the respective controlled zone.

The output from gauges 80, 81, and 235 are coupled to separate recorders 320, 321, and 322, alike and the same type as previously described recorder 290 (FIG. 5). The limit switches 330 and 331 on each recorder are connected in series between the integrator 122 and the measuring servos 229, 230, and 231, respectively, for zones 19, 20, and 21. Both limit switches 330 and 311 on a recorder are closed only when the respective gauge output signal falls within the deadband defined by the limits 295 and 294 about target thickness 292. This is in contrast to the limit switch arrangement for the entire width property average described in connection with FIGS. 5 and 6 where the limit switches 330 and 331, upper and lower for each recorder were in series and this combination, when closed, energized a relay to close a switch that was in series with other relay switches similarly arranged with the limit switches of their recorders. Then, all limit switches had to close corresponding to each gauge output signal being within the deadband about target thickness to offset the target signal from the target thickness. In the individual zone control with zone averaging only the limit switches 330 and 331 of the recorder attached to the gauge on the controlled zone must be closed, corresponding to the gauge output signal being within the deadband about the target thickness.

Several other combinations of gauges can be used to produce the present invention. For example, there can be three or more controlled zones each with a fixed gauge adjacen tthereto coupled to a controller that compares the gauge output signal with a target signal corresponding to target property. Each controller target can be offset in response to a recomputed average property deviation from target property. In another combination a single gauge can be positioned successively to a location adjacent each zone to provide an output signal proportional to the property in each location. Thus, the one gauge performs the functions of three or more gauges. At each location the gauge output signal is compared with a target signal corresponding to target property and the target signal is offset. Another arrangement is the elimination of all but one gauge. This gauge is programed first to scan the sheet or zone and then to measure the property at each zone. The property at each zone is compared with the target property for the zone or at least partially across the dimension and the target signal is offset, as described above.

The above described and other embodiments of control apparatuses can be modified, rearranged, or have substitute components without departing from the present invention. The method of the present invention can be practiced by many combinations of control apparatuses for the operation of numerous types and arrangements of regulating apparatuses. These changes and other arrangements are within the scope of the present invention as defined in the appended claims.

What is claimed is:

1. A method of controlling a property of a zone of material where the property at one location in the zone is measured by a stationary gauge and the measured property is compared with a target to determine the degree of apparatus adjustment necessary to change the zone material property to a target property, comprising the step of, adjusting the target only when the measured property is substantially at the target property as a function of the difference between the average property of at least a portion of the material across the material width including said location and the target property to bring the average material property in the zone to the target property.

2. A method of controlling a property in several zones across a material dimension where the property at a location in each zone is measured by a stationary gauge means and the measured property in each zone is compared with a separate target to determine the degree of regulating apparatus adjustment necessary to change the property in each of the zones to a target property for each of said zones, comprising the step of, adjusting the target for each of the zones only when the measured property is substantially at the target property for the zone as a function of the difference between the average property of the respective zones across the material dimension and the target property to bring the average material property in each zone to the target property for the zone.

3. Control apparatus for adjusting a regulating means that substantially uniformly varies the property in a zone at least partially across the material dimension, the control apparatus comprising, gauge means for indicating the property at one location in said zone of the material and for indicating the property average at least partially across the material dimension including said location, controller means for comparing said one location property indication with a target signal and producing a first control signal for actuating said regulating means to reduce the difference between said target signal and the location property indication to substantially zero, and means for changing said target signal only when said difference is substantially zero as a function of the difference between said indicated property average and one target signal representing a desired target property to another target signal to cause said controller means to compare the indicated property with said another target signal that brings the average zone property to said desired target property.

4. Apparatus for maintaining a substantially uniform property across a dimension of a material comprising, gauge means for indicating the property at a location in each of several zones across the material dimension and for indicating the property average in each of said zones, regulating means for separately varying the property in each of said zones, controller means coupled to said gauge means and to said regulating means for comparing the indicated property in each of said zones with a target signal for the respective zone to energize said regulating means to change the property at each of said locations to a target property set by the target signal for each zone, means for varying the target signal for each zone as a function of the difference between the indicated property average for each zone and said target signal only when the indicated property is substantially equal to the target property, to change the target signal from one target signal representing the desired target property to another target signal to cause said controller means to compare the indicated property with said another target signal that brings the indicated zone property average to said desired target property.

5. Apparatus for maintaining a target property across a material dimension, comprising, first gauge means for indicating the property at one location across the material dimension, regulating means for changing the property across the material dimension including said one location, second gauge means for indicating the average property deviation from the target property across the material dimension including said location, means for controlling said regulating means to change the material property across the material dimension in response to the difference between a target signal representing the target property and the indicated property at said one location, and for changing said the target signal only when the indicated property is substantially at the target property in response to said indicated average property deviation to change the material average property to substantially equal the target property.

6. Apparatus, as described in claim 5, wherein, said controlling means comprises a first computer that provides a signal proportional to the difference between a target signal representing the target property and the indicated property at said location, and said target signal is changed in inverse proportion to said average property deviation from the target property.

7. Apparatus for maintaining a substantially uniform target property across a material dimension, comprising, first gauge means for providing an output signal proportional to the property at one location in a zone across the material dimension, first measuring servo coupled to receive the gauge means output signal, first bridge means for providing a control signal that is a function of the difference between said first gauge means output signal and a target signal comprising a repeat slidewire potentiometer having its arm driven by said first measuring servo and a target potentiometer having an arm normally set to a position corresponding to a desired target property, with the control signal being taken between the arms of the repeat slidewire potentiometer and the target potentiometer, second gauge means for scanning across the material dimension and providing an output signal proportional to the property across the material dimension, computer means coupled to said second gauge means for providing an output signal that is a function of the average deviation of property across the dimension from the desired target property, means coupled to receive said computer means output signal and to change the position of said target potentiometer arm as an inverse function of the average property deviation from the target property only when said first gauge means output signal falls within a deadband about the signal for said desired target property, regulating means for substantially uniformly changing the property of said zone across the material dimension, said regulating means being energized by said control signal to restore the average material property in said zone to the desired target property.

8. Apparatus for maintaining a uniform traget property across a material dimension, comprising, a first gauge means for providing an output signal proportional to the property at a location in a first zone across the material dimension, first measuring servo coupled to receive said first gauge output signal, first bridge means for providing a first control signal that is a function of the difference between said first gauge output signal and a target signal, comprising a repeat slidewire potentiometer having its arm driven by said first measuring servo and a target potentiometer having an arm normally set to a position corresponding to a desired target property, with the first control signal being taken between the arms of the repeat slideware potentiometer and the target potentiometer, a second gauge means for providing an output signal proportional to the property at a location in a second zone across the material dimension, second measuring servo coupled to receive said second gauge output signal, second bridge means for providing a second control signal that is a function of the difference between said second gauge output signal and a target signal, comprising a repeat slidewire potentiometer having its arm driven by said second measuring servo and a target potentiometer having an arm normally set to a position corresponding to a desired target property, with the second control signal being taken between the arms of the repeat slidewire potentiometer and the target potentiometer, third gauge means for scanning across the material dimension and providing an output signal proportional to the property across the material dimension, computer means coupled to receive said third gauge output signal to provide a third signal proportional to the average property deviation across the material dimension including said first and second zones from the target property, first means coupled to receive said computer means third signal to change the position of the target potentiometer arms of each of said first and second bridge means as an inverse function of the average property deviation from said desired target property only when said first and second gauge means output signals fall within a deadband about the signal for said desired target property, regulating means for substantially uniformly changing the property separately in said first zone in response to said first control signal to restore the material property in said first zone to the target property, and for uniformly changing the property separately in said second zone in response to said second control signal to restore the material property in said second zone to the property target.

9. Apparatus for maintaining a uniform target property across a material dimension, comprising,
   a first gauge means for providing output signal proportional to the property at a location in a first zone across the material dimension,
   first measuring servo coupled to receive said first gauge output signal,
   first bridge means for providing a first control signal that is a function of the difference between said first gauge output signal and a target signal and comprising a repeat slidewire potentiometer having its arm driven by said first measuring servo and a target potentiometer having an arm normally set to a position for a target signal at this arm corresponding to a target property, with the first control signal being taken between the arms of the repeat slidewire potentiometer and the target potentiometer,
   a second gauge means for providing an output signal proportional to the property at a location in a second zone across the material dimension,
   second measuring servo coupled to receive said second gauge output signal,
   second bridge means for providing a second control signal that is a function of the difference between said second gauge output signal and a target signal and comprising a repeat slidewire potentiometer having its arm driven by said second measuring servo and a target potentiometer having an arm normally set to a position for a target signal at this arm corresponding to a target property, with the second control signal being taken between the arms of the repeat slidewire potentiometer and the target potentiometer,
   third gauge means for scanning across the material dimension and providing an output signal proportional to the property across the material dimension,
   computer means coupled to receive the third gauge output signal to provide a third signal proportional to the average property deviation across the material dimension of said first zone from the set target property and a fourth signal proportional to the average property deviation across the material dimension of said second zone from the set target property,
   first means coupled to receive said computer means third signal to vary the position of the target potentiometer of said first bridge means to change the target signal as an inverse function of the average property deviation from the set target property only when said first gauge means output signal falls within a deadband about the signal for the set target property,
   second means coupled to receive said computer means fourth signal to vary the position of the target potentiometer of said second bridge means to change the target signal as an inverse function of the average property deviation from the target property only when said second gauge means output signal falls within a deadband about the signal for the set target property,
   regulating means for substantially uniformly changing the property separately in said first zone in response to said first control signal to restore the material property in said first zone to the set target property, and for substantially uniformly changing the property separately in said second zone in response to said second control signal to restore the material property in said second zone to the set target property.

10. Apparatus for controlling the profile of a material, comprising,
    a mill having a first roll and a second roll, first screw-down motor means for adjusting the spacing between said rolls at one end, second screw-down motor means for adjusting the spacing between said rolls at the opposite end,
    said mill being operable to form a sheet material and by said first and second screw-down motor means to adjust the sheet profile thickness at the respective ends,
    first radiation gauge means disposed adjacent one portion of the sheet near one end to measure sheet thickness at that location,
    second radiation gauge means disposed adjacent another portion of the sheet near the other end to measure sheet thickness at that location,
    third radiation gauge means arranged for movement across the sheet,
    integrator means coupled to said third gauge to average the gauge output signal for at least a partial scan of the sheet and to produce a target offset signal proportional to the average deviation of sheet thickness from a target thickness for at least one portion along the material width,
    a first controller means for comparing the output from said first gauge with a target signal and producing a first control signal proportional to the difference for energizing said first screw-down motor means to restore the measured sheet thickness at said one end to said target thickness,
    a second controller for comparing the output from said second gauge with a target signal and producing a second control signal proportional to the difference for energizing said second screw-down motor means to restore the measured sheet thickness at said opposite end to said the target thickness, and
    control means for changing said target signal as a function of said target offset signal only when said first and second gauge means are measuring a thickness within a deadband about said target thickness to restore said sheet thickness to said target thickness.

11. A method of controlling a property of a zone of material where the property of a portion of the zone is measured by a stationary gauge means and the measured property is compared with a target to determine the degree of apparatus adjustment necessary to change that portion of the zone material property to said target property, comprising the step of,
    adjusting the target as a function of the difference between the average property of at least a portion of the material across the material width including said zone portion and the target property to bring the average material property in the zone to the target property.

12. Control apparatus for adjusting a regulating means that substantially uniformly varies the property in a zone at least partially across the material dimension, the control apparatus comprising,
    gauge means for indicating the property of a portion of said zone with a stationary gauge and for indicating the property average at least partially across the material dimension including said portion,
    controller means for comparing said portion property indication with a target signal and producing a first control signal for actuating said regulating means to reduce the difference between said target signal and the portion property indication to substantially zero, and
    means for changing said target signal as a function of the difference between said indicated property average and one target signal representing a desired target property to another target signal to cause said controller means to compare the indicated property with said another target signal that brings the average zone property to said desired target property.

References Cited

UNITED STATES PATENTS

| | | | |
|---|---|---|---|
| 2,829,268 | 4/1958 | Chope | 250—83.6 |
| 3,040,807 | 6/1962 | Chope | 162—252 |
| 2,882,476 | 4/1959 | Wetzel | 318—162 |
| 2,952,296 | 4/1960 | Kofoid | 156—360 X |
| 3,024,404 | 3/1962 | Ziffer | 162—262 X |
| 3,179,800 | 4/1965 | McNamara | 250—52 |
| 3,188,256 | 6/1965 | Shoemaker | 156—378 X |
| 3,244,881 | 4/1966 | Hansen et al. | 250—52 X |
| 3,307,215 | 3/1967 | Gerhard et al. | 250—52 X |

FOREIGN PATENTS

| | | |
|---|---|---|
| 1,119,360 | 12/1961 | Germany. |
| 880,689 | 10/1961 | Great Britain. |

HAROLD ANSHER, Primary Examiner

U.S. Cl. X.R.

18—2, 10; 118—9; 156—244, 360, 378, 500; 162—259; 250—52